United States Patent [19]

Ryan

[11] 4,205,973
[45] Jun. 3, 1980

[54] METHOD AND APPARATUS FOR MEASURING THE VOLUME AND SHAPE OF A GLASS GOB

[75] Inventor: William H. Ryan, Toledo, Ohio
[73] Assignee: Owens-Illinois, Inc., Toledo, Ohio
[21] Appl. No.: 958,770
[22] Filed: Nov. 8, 1978
[51] Int. Cl.² .................................................. C03B 5/24
[52] U.S. Cl. ........................................ 65/29; 65/158; 65/164; 250/224; 356/380
[58] Field of Search .......................... 65/29, 158, 164; 250/224; 356/158

[56] References Cited

U.S. PATENT DOCUMENTS

| | | | |
|---|---|---|---|
| 3,486,875 | 12/1969 | Pymm | 65/29 X |
| 3,513,444 | 5/1970 | Henderson et al. | 340/172.5 |
| 3,588,480 | 6/1971 | Unger et al. | 250/228 X |
| 3,819,918 | 6/1974 | Hale | 356/158 |
| 4,046,536 | 9/1977 | Smithgall, Sr. | 65/29 X |
| 4,090,241 | 5/1978 | Houston | 65/326 X |
| 4,102,661 | 7/1978 | Dudderar | 65/29 X |

FOREIGN PATENT DOCUMENTS 1055125 10/1953 France ................................. 250/224

Primary Examiner—Arthur D. Kellogg
Attorney, Agent, or Firm—D. T. Innis; Myron E. Click; David H. Wilson

[57] ABSTRACT

Apparatus and method for measuring the volume and shape of a falling gob of glass. Two cameras are used to make section by section measurements of the horizontal extent of the moving gob. Timing of the measurements is controlled so as to cause measurements to be made at equal increments of the motion of the gob. The measurements are made 90° apart with respect to the gob and are utilized to determine the volume of each section of the gob. The volumes of the individual sections of the gob are then summed to determine the total volume of the gob. An image of the gob is generated on a television screen to aid in the determination of the shape of the gob.

15 Claims, 7 Drawing Figures

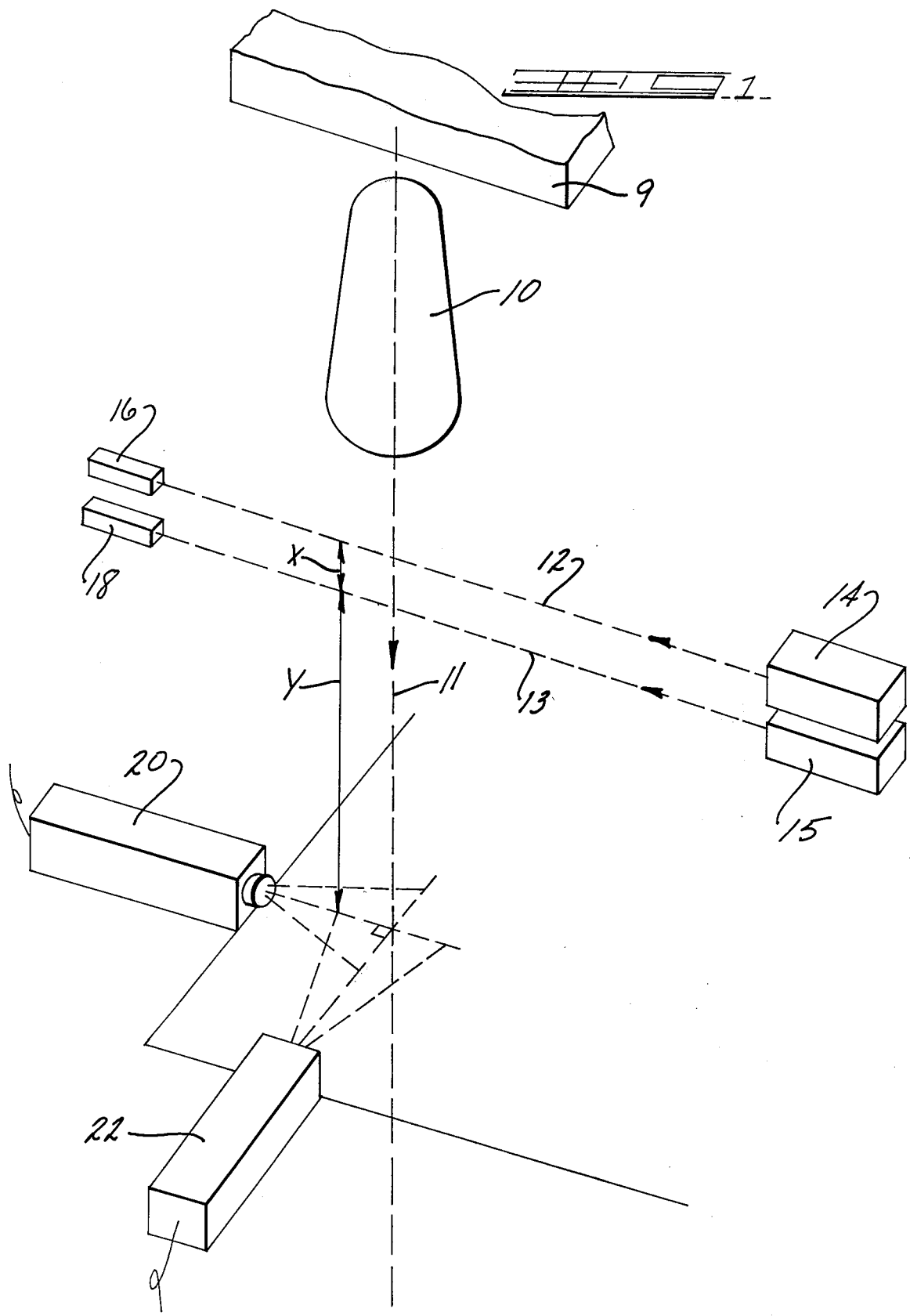

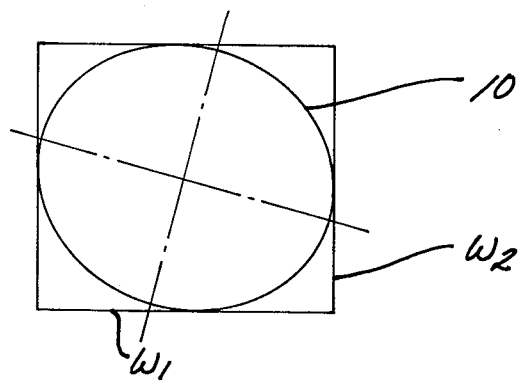
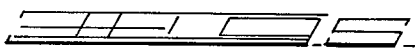
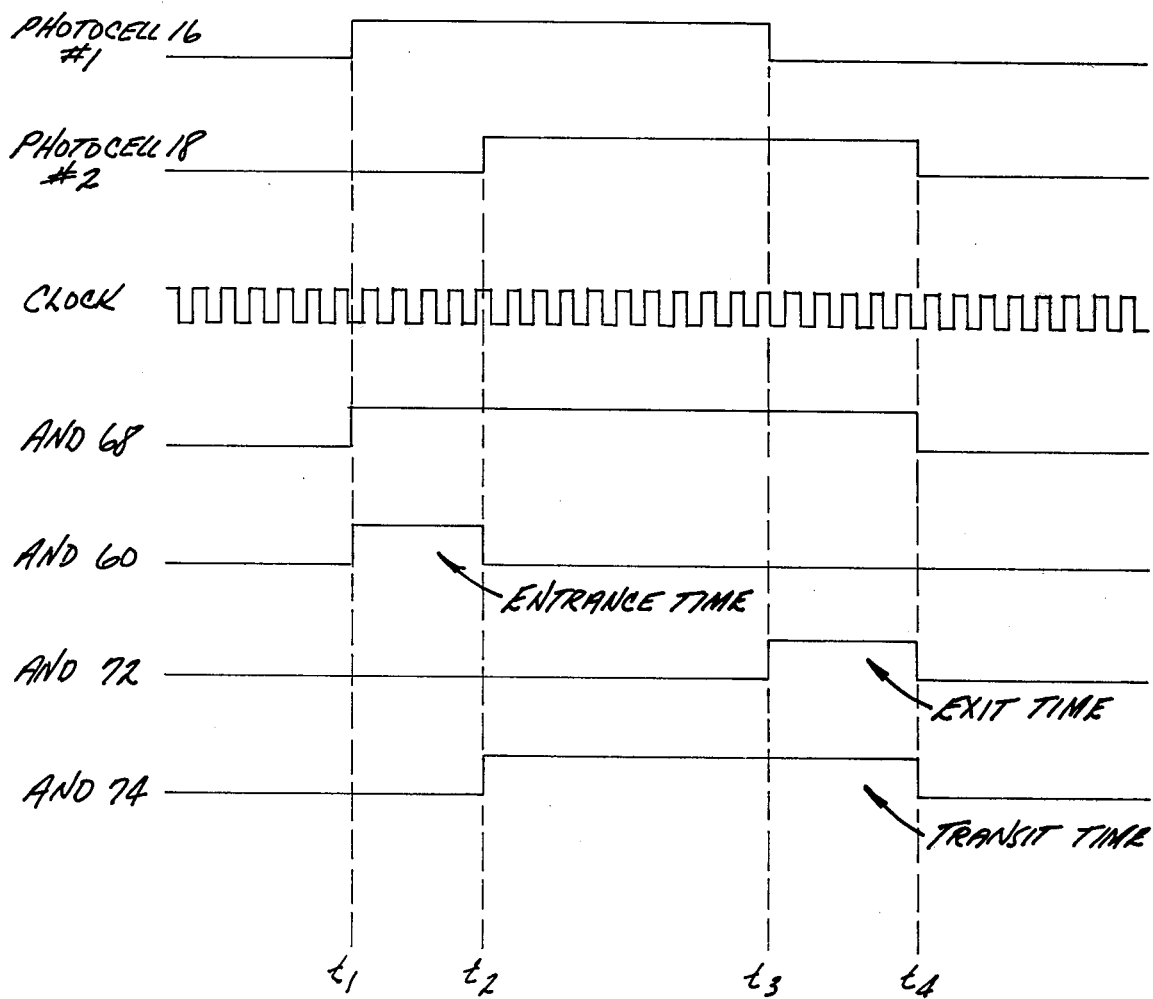

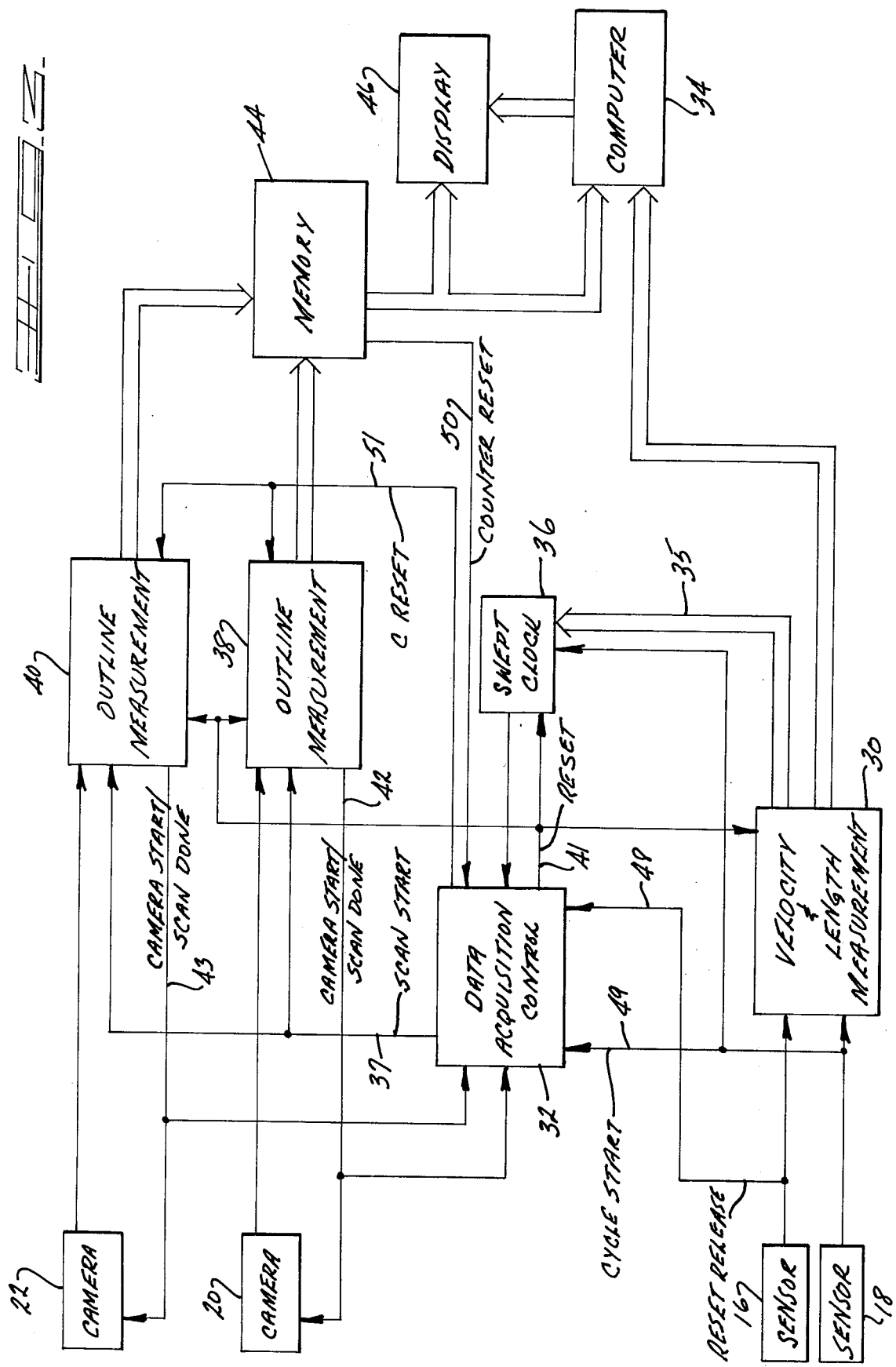

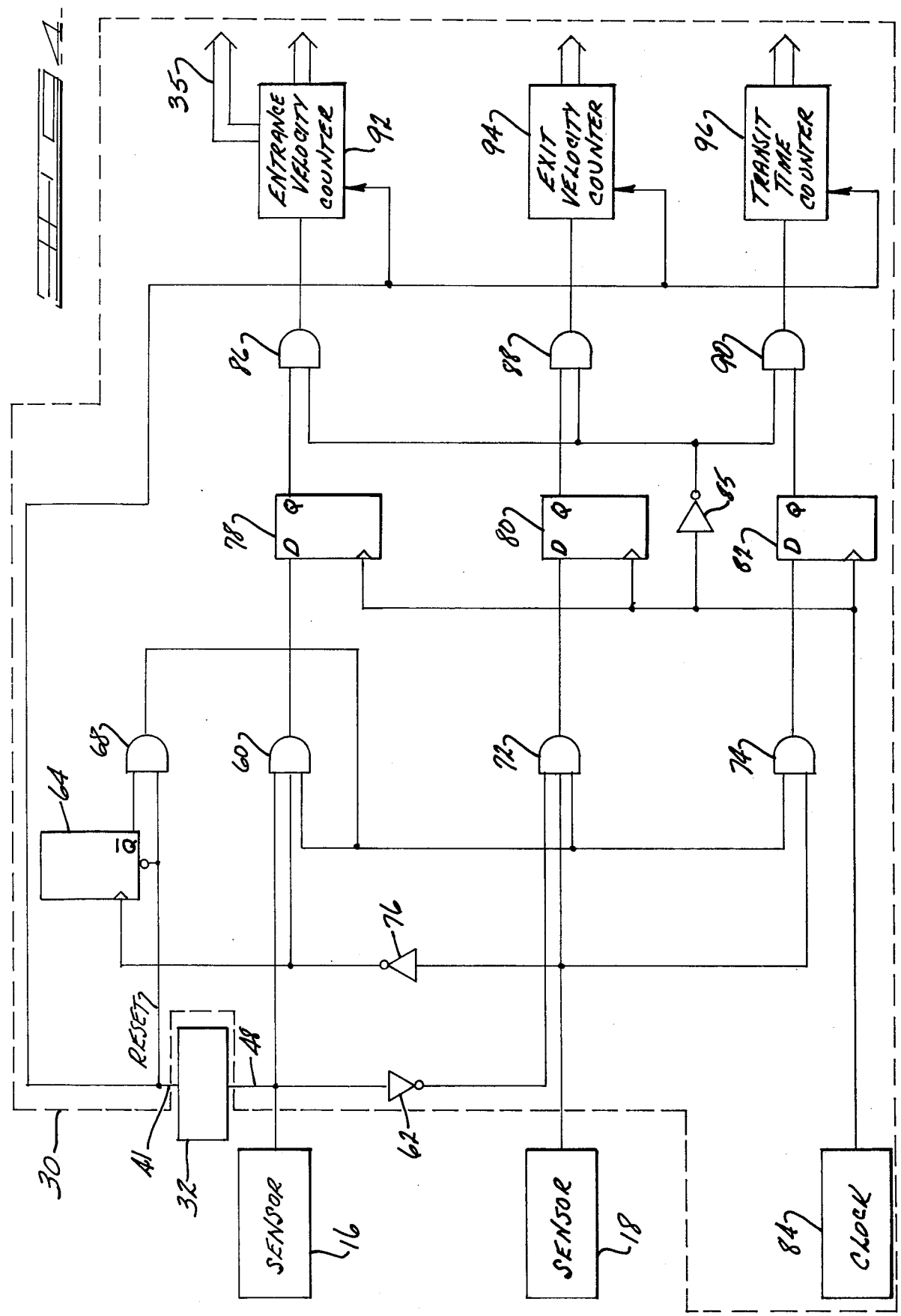

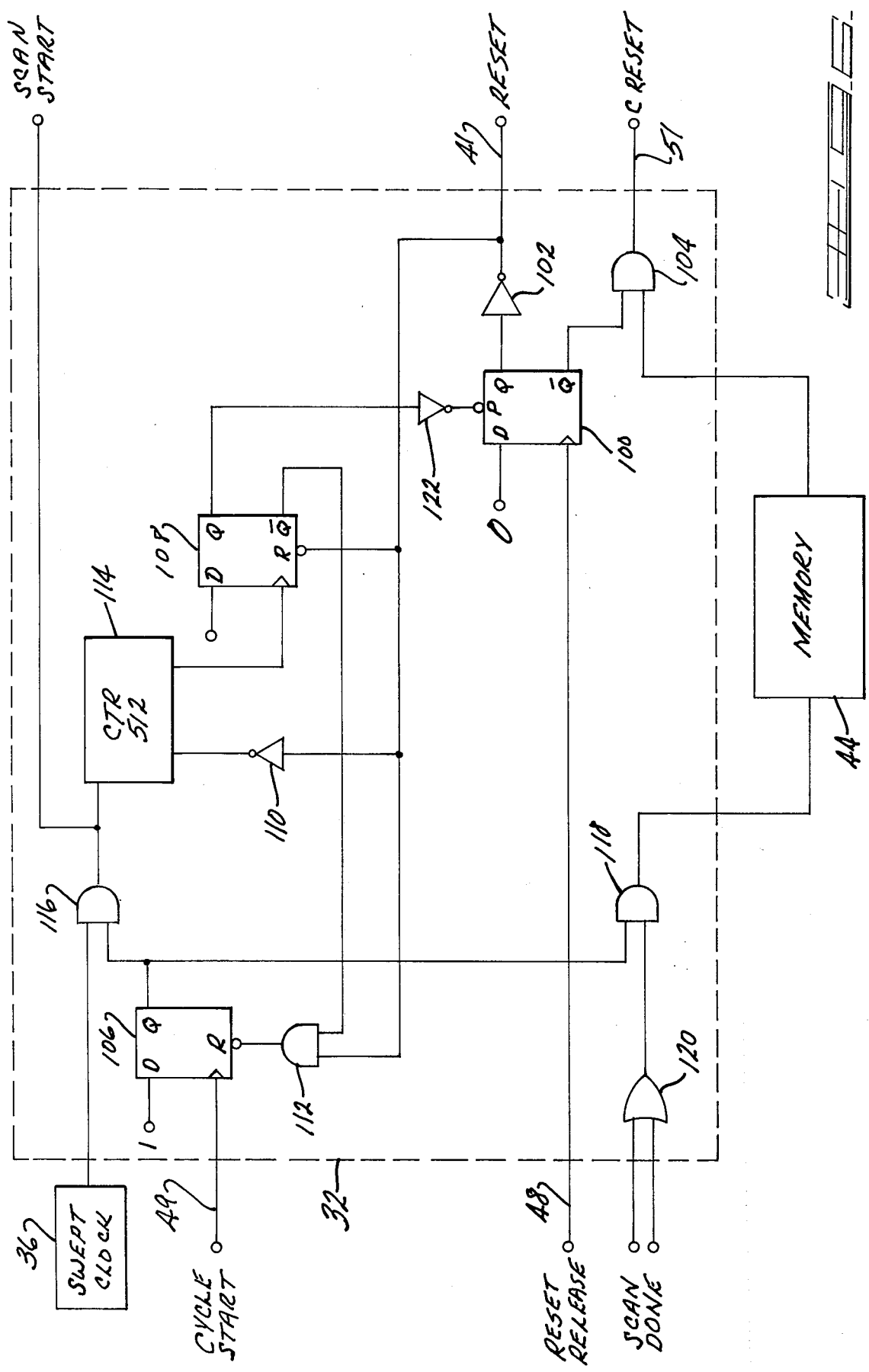

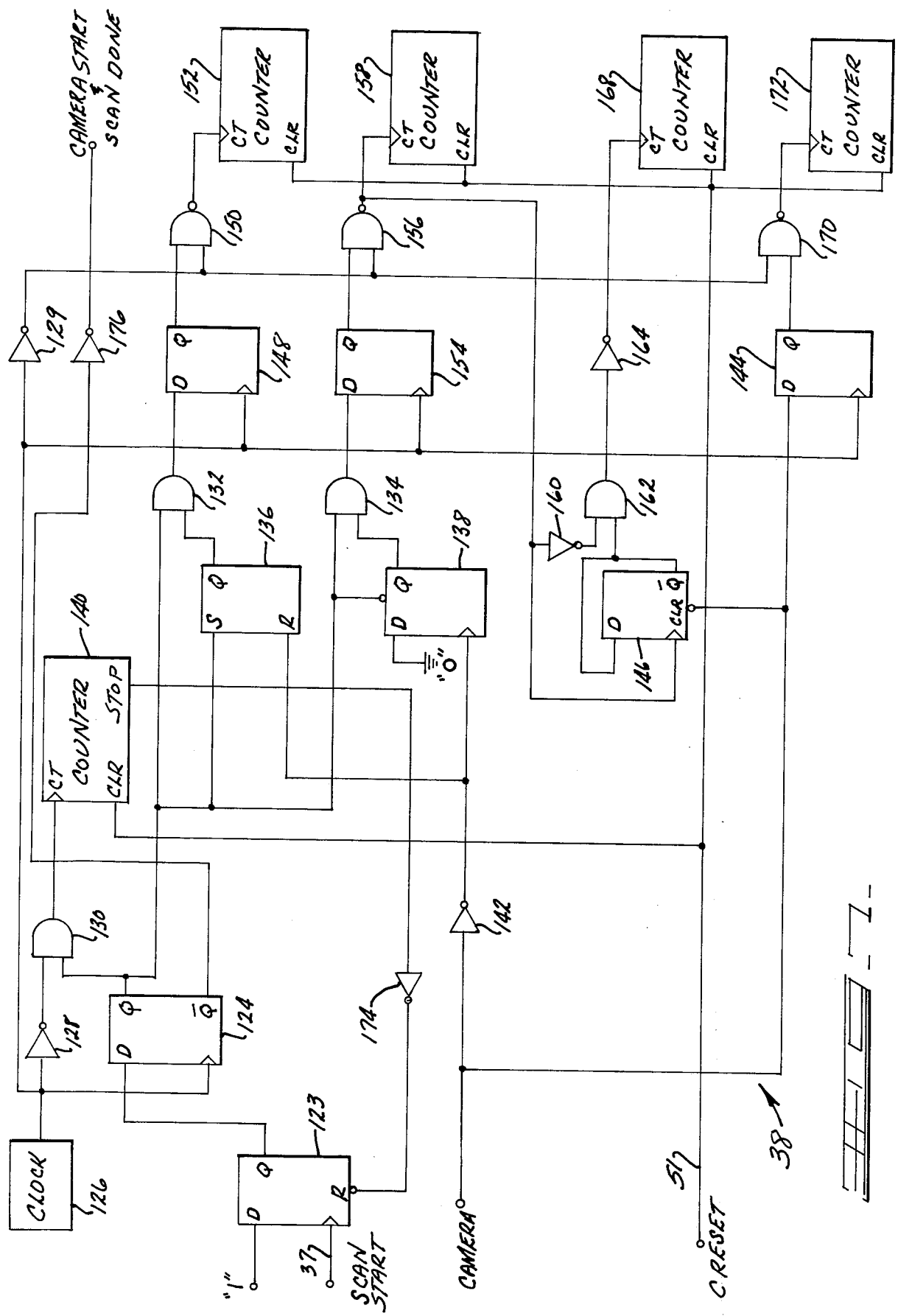

METHOD AND APPARATUS FOR MEASURING THE VOLUME AND SHAPE OF A GLASS GOB

BACKGROUND OF THE INVENTION

This invention relates to the measurement of the volume and shape of a uniformly accelerating article. More particularly, this invention relates to the measurement of the volume and shape of a freely falling article. Still more particularly, this invention relates to the measurement of the volume and shape of a falling glass gob which is delivered from a feeder to a glass forming machine.

In the formation of glass articles, a gob of molten glass is dropped from a feeder into a glass forming machine. The volume (or weight) and shape of the gob are factors which need to be controlled to insure proper formation of the final glass article. Therefore, it is necessary to monitor these factors in order to determine if the gobs are acceptable. Previously, spot checks were made by catching a falling gob in a ladle and weighing it. Since the density of the glass is known, the volume of the gob could then be determined. Gob shapes were qualitatively guessed at by visually observing the gob as it fell. The operation of the glass feeder was then adjusted by the machine operator so as to obtain correctly sized and shaped gobs.

Disadvantages of the above described method are that the gobs must be stopped in order to be weighed and that visual observation of the falling gob to determine its shape is not very accurate. Adjustment of the size and shape of gobs has thus been largely a trial and error procedure.

SUMMARY OF THE INVENTION

Disclosed is an apparatus and method for measuring the volume and shape of a falling gob of glass whose cross-sectional shape is either circular or slightly elliptical. As the gob moves past an inspection point, two cameras, located 90° apart with respect to the gob, are utilized to measure the horizontal extent of the gob. Successive measurements are made corresponding to equal increments of the motion of the gob. The timing of these measurements is controlled by a swept clock in order to compensate for the acceleration of the gob. The measurements are stored in a memory until the entire gob has passed the inspection point. A computer is then utilized to determine the volume of the gob. The cross-sectional area corresponding to each of the successive measurements is determined by multiplying the two values obtained in each measurement by each other and multiplying the product by $\pi/4$. This area is then multiplied by the distance between measurements in order to obtain a measure of the volume of each successive "slice" of the gob. The volumes of all of the "slices" contained in the gob are summed in order to determine the total volume of the gob.

The information obtained from the cameras is also utilized to drive a display which is used to determine the shape of the gob. In addition, the display is utilized to determine the orientation of the gob, i.e., the tilt of the longitudinal axis of the gob with respect to its path of travel.

BRIEF DESCRIPTION OF THE DRAWINGS

In the drawings:

FIG. 1 is a schematic diagram of the inspection system of the present invention;

FIG. 2 is a top sectional plan view of a glass gob;

FIG. 3 is a block diagram of the measurement system of the present invention;

FIG. 4 is a schematic diagram of the velocity and length measurement circuit of the invention;

FIG. 5 is a timing diagram for the circuit of FIG. 4;

FIG. 6 is a schematic diagram of the data acquisition control circuit of the invention; and FIG. 7 is a schematic diagram of the outline measurement circuit of the invention.

DETAILED DESCRIPTION OF THE DRAWINGS

Referring to FIG. 1, a gob of molten glass 10 falls from a glass feeder 9 along a path denoted by a dashed line 11. Two parallel laser beams 12 and 13, generated by lasers 14 and 15 respectively, are directed so as to intersect the line 11. The distance between the laser beams 12 and 13 is denoted by a line x. After passing through the line 11, the laser beams 12 and 13 impinge upon a pair of photocell sensors 16 and 18, respectively. The sensors 16 and 18 generate a logic "0" when the laser beams 12 and 13 strike them and a logic "1" when the laser beams 12 and 13 do not strike them. As the gob 10 falls, it breaks the paths of the laser beams 12 and 13, thus preventing them from striking the sensors 16 and 18. Each of the sensors 16 and 18 thus generates a "1" whenever the gob 10 has broken the path of the corresponding laser beam 12 or 13. After the gob 10 has fallen enough, each laser beam 12 and 13 will again strike its corresponding sensor 16 or 18, causing the outputs of the sensors 16 and 18 to go to "0".

By measuring the amount of time between the sensing of the leading edge of the gob 10 by each of the sensors 16 and 18, it is possible to determine the average velocity of the leading edge of the gob 10 as it passes the laser beams 12 and 13 (since the distance X is known). The distance X is relatively small so that the velocity may be considered to be instantaneous. The velocity of the trailing edge of the gob 10 may likewise be determined by measuring the time it takes the trailing edge to pass the laser beams 12 and 13. In addition, the time it takes the entire gob 10 to pass the laser beam 13 may be measured, and the length of the gob may be determined from this measurement (by the equation $L = V_o t + \frac{1}{2} a t^2$, where $V_o$ is the intitial velocity of the gob 10, a is acceleration due to gravity, t is the time it takes the entire gob 10 to pass the laser beam 13, and L is the length of the gob).

As the gob 10 continues to fall it is viewed from two different angles by a pair of cameras 20 and 22. The cameras 20 and 22 are located so that the views are taken 90° apart and at a distance Y from the laser beam 13 (measured along the line 11). The cameras 20 and 22 are conventional in the art and include a horizontal array of 768 photodiodes (not shown). The cameras 20 and 22 each provide a digital output, i.e. each photodiode in the array has an output of either logic "1" or "0" depending upon whether that particular photodiode is sensing light from the gob 10 or from the background. The threshold of the photodiode array is adjustable, so that the contrast between the light received from the gob 10 and the background may be detected. As the gob 10 falls, the photodiode array is scanned at rapid intervals. The speed of scanning is such that for practical purposes each scan is taken horizontally across the gob 10. Each view taken by the cameras 20 and 22 includes more than the entire cross-sectional extent of the gob 10 and a very small fraction of its length. Each photodiode represents a fixed width, i.e. if the entire view of each of the cameras 20 and 22 covers 768 millimeters, each photodiode would represent one millimeter of that view. Successive scans are made corresponding to equal increments in the motion of the gob 10 (for example, one scan for every millimeter of motion of the gob 10). In the present embodiment of the invention, 512 scans are made by the cameras, beginning with the sensing of the passage of the gob 10 by the sensor 18. The scans are made at intervals which allow the complete length of the gob 10 to be viewed by the cameras 20 and 22. By combining the successive scans of the cameras 20 and 22, the entire outline of the falling gob 10 may be determined.

The cameras 20 and 22 thus scan successive "slices" or sections of the gob 10 as it falls. The measurements obtained from these scans can be utilized to determine the cross-sectional area corresponding to each scan. The cross-sectional shape of the gob 10 is either circular or near circular (i.e. elliptical having major and minor axes which differ by no more than about fifteen percent). If the cross-section is actually circular, its area may be determined by utilizing only one of the cameras 20 or 22. The output of the camera 20 or 22 will correspond to the diameter of the cross-section. The cross-sectional area may be determined by squaring the diameter and multiplying by $\pi/4$. If the cross-section is elliptical, as shown in FIG. 2, both cameras 20 and 22 are needed to increase the accuracy of the cross-sectional area determination. The outputs of the cameras 20 and 22 in this case generally correspond to the values of major and minor axes of the elliptical shape. Since the ellipse is near circular, the fact that the camera views may not be aligned with respect to the axes of the ellipse introduces negligible error into the area determination. The two values from the cameras are multiplied together and then multiplied by $\pi/4$ to determine the area of the elliptical cross-section. It should be noted that two cameras could also be used even if the cross-section were circular, since a circle is simply an ellipse whose major and minor axes are equal.

Referring to FIG. 2, a cross-sectional slice of the gob 10 is shown as having a slightly elliptical shape. The measurements taken by the cameras 20 and 22 result in readings of $W_1$ and $W_2$, respectively. Although these measurements do not always exactly correspond to the major and minor axes of the elliptical shape, the error introduced by this misalignment is minimal.

Having thus determined the cross-sectional area of each successive slice of the gob 10, the volume of each slice may be determined by multiplying the cross-sectional area by the height (i.e. the distance between measurements). Since the distance between scans is relatively small, the fact that the walls of each slice may not be exactly vertical has negligible effect on the volume determination. The volume of the entire gob 10 may be determined by summing the volumes of the individual slices. By multiplying the volume of the gob 10 by the known density of the glass contained in it, the weight of the gob 10 may also be determined.

In summary, the volume of the gob 10 may be approximated by using one camera for a diameter measurement and assuming that the cross-sectional shape is circular. Since the cross-sectional shape is generally somewhat elliptical, however, the approximation may be improved by utilizing two cameras spaced 90° apart with respect to the gob 10, the outputs of which are approximations of the axes of the elliptical cross-sections. For the purposes of this description, both diameter and elliptical axes measurements will be referred to as horizontal extent measurements.

Referring now to FIG. 3, a block diagram of the control system of the present invention is shown. The outputs of the sensors 16 and 18 are fed to a circuit 30 which is utilized to determine the velocity and length of the falling gob 10. In addition, the outputs of the sensors 16 and 18 are connected to a circuit 32 which controls the acquisition of data from the cameras 20 and 22 and the circuit 30. These inputs to the circuit 32 are labeled reset release and cycle start and are denoted by lines 48 and 49, respectively. Data from the velocity and length measurement circuit 30 is fed to a computer 34. Another output of the circuit 30 denoted by a line 35 is connected to a swept clock 36. Also, the output of the sensor 18 is connected to the swept clock 36. The swept clock 36 provides an output of varying frequency which is connected to the data acquisition control circuit 32. The swept clock 36 is utilized to control the rate of scanning of the cameras 20 and 22 so that a scan occurs for equal increments of the motion of the gob 10 despite varying velocity. The value of this increment is equal to the height of each slice of the gob 10. An output of the data acquisition control circuit 32, labeled scan start and denoted by a line 37, is connected to a pair of identical circuits 38 and 40 which are utilized to measure the outline of the gob 10. A reset signal, also generated by the data acquisition control circuit 32, is connected via a line 41 to the circuits 30, 38, and 40 and to the swept clock 36.

When the outline measurement circuits 38 and 40 receive the scan start signal from the data acquisition control circuit 32, they each generate a signal labeled camera start/scan done and denoted by lines 42 and 43. The lines 42 and 43 are connected to the cameras 20 and 22, respectively, and to the data acquisition control circuit 32. The camera start/scan done signals cause the cameras 20 and 22 to make one scan, and also allow the data acquisition control circuit to generate the next scan start signal. The output of each camera 20 and 22 is connected to the corresponding outline measurement circuit 38 or 40. Data from the outline measurement circuits 38 and 40 are fed to a memory 44. The output of the memory 44 is connected to a display 46 and to the computer 34. The output of the computer 34 is also connected to the display 46.

The operation of the above described system begins with the sensing of the leading edge of the gob 10 by the sensor 16. The reset release signal from the sensor 16 causes the data acquisition control circuit 32 to generate the reset signal. When this signal is generated the circuits 30, 38, and 40 are ready to receive data and the swept clock 36 is cleared. The velocity and length measurement circuit 30 determines the time intervals between the sensing of different portions of the gob 10 by the sensors 16 and 18. Signals representing these time intervals are then sent to the computer 34 where the entrance velocity, exit velocity and length of the gob 10 are determined. The entrance velocity signal is also sent to the swept clock 36. When the sensor 18 senses the leading edge of the gob 10, the cycle start signal causes the data acquisition control circuit 32 to generate the scan start signal to the outline measurement circuits 38 and 40. The circuits 38 and 40 then begin receiving signals from the cameras 20 and 22. As the gob 10 falls the cameras 20 and 22 are scanned and the circuits 38 and 40 determine the width and the location of the edges and center of the gob 10 for each scan. The cameras 20 and 22 are scanned at equal intervals of motion of the gob 10. The scanning rate is controlled by the swept clock 36. After the cameras 20 and 22 have been scanned 512 times, the data acquisition control circuit 32 stops generating scan start signals. The scanning sequence begins again when the next reset release and cycle start signals are received.

After each scan of the cameras 20 and 22, the data gathered by the outline measurement circuits 38 and 40 is placed in the memory 44. Once the memory 44 has all of the data, a counter reset signal, shown by a line 50, is sent to the data acquisition control circuit 32. The circuit 32 in turn generates a signal to the circuits 38 and 40 which reset data counters contained in those circuits. This signal is labeled C reset and is denoted as a line 51. The information stored in the memory 44 is sent to the display 46, where the two views of the gob 10 are displayed on a screen. The computer 34 utilizes the information stored in the memory to determine the volume and weight of the gob 10. This information is then sent to the display 46.

Referring to FIG. 4, the velocity measurement circuit 30 is shown. Initially the sensor 16 generates an output of logic "1" when the falling gob 10 breaks the path of the laser beam 12. The output of the sensor 16 is connected to the control circuit 32 via line 48, to an input of an AND gate 60, and to an inverter 62. The reset output of the control circuit 32 goes to logic "1" when the output of the sensor 16 is "1". The reset output is connected to an inverted clear input of a flip flop 64 and to an input of an AND gate 68. The $\bar{Q}$ output of the flip flop 64 is connected to the other input of the AND gate 68. The output of the flip flop 64 is initially "1", so when the reset signal becomes "1", a "1" is generated at the output of the AND gate 68. The output of the AND gate 68 is connected to inputs of AND gates 60, 72, and 74. The AND gates 60, 72, and 74 are thus enabled when the output of the AND gate 68 is "1".

The output of the sensor 18 is connected to an input of each of the AND gates 72 and 74, and to the input of an inverter 76. The output of the inverter 76 is connected to an input of the AND gate 60 and to the clock input of the flip flop 64. The flip flop 64 is thus clocked when the output of the inverter changes from "0" to "1", which occurs when the trailing edge of the gob 10 passes the sensor 18. The output of the flip flop 64, which was cleared when the reset signal was "0", goes to "0" when a "1" is received at its clock input. This in turn causes the output of the AND gate 68 to go to "0". The output of the AND gate 68 is thus "1" between the time the sensor 16 first senses the gob 10 and the time the sensor 18 last senses the gob 10.

The output of the AND gate 60 is "1" when the output of sensor 16 is "1" and the output of sensor 18 is "0" (assuming the output of the AND gate 68 is "1"). This corresponds to the time between the sensing of the leading edge of the gob 10 by each of the sensors 16 and 18. The output of the AND gate 72 is "1" when the output of the sensor 16 is "0" and the output of the sensor 18 is "1" (again assuming that the output of the AND gate 68 is "1"). This corresponds to the time between the sensing of the trailing edge of the gob 10 by each of the sensors 16 and 18. The output of the AND gate 74 is "1" when the output of the AND gate 68 is "1" and the output of the sensor 18 is "1". This corresponds to the time it takes the complete gob 10 to pass the sensor 18, i.e. the transit time.

The outputs of the AND gates 60, 72, and 74 are connected to the data inputs of flip flops 78, 80, and 82, respectively. The output of a clock 84 is connected to the clock inputs of each of the flip flops 78, 80 and 82. The data of each of the flip flops 78, 80 and 82 is passed to the output when a clock signal is received, thus synchronizing the outputs of the AND gates 60, 72, and 74 with the clock signal. The output of the clock 84 is also connected to the input of an inverter 85. The output of the inverter 85 is connected to an input of each of three AND gates 86, 88, and 90. The outputs of the flip flops 78, 80, and 82 are connected to the remaining inputs of the AND gates 86, 88, and 90 respectively. Thus, the inverted clock signal is passed to the output of each of the AND gates 86, 88, and 90 when the output of the respective flip flop 78, 80 or 82 is "1". The outputs of the AND gates 86, 88, and 90 are connected to the clock inputs of three counters 92, 94, and 96, respectively. The counters 92, 94, and 96 thus count the number of clock pulses occuring during the times that the respective outputs of each flip flop 78, 80 and 82 is "1". The counters 92, 94 and 96 are cleared when the reset signal is received from the control circuit 32.

From the foregoing, it is apparent that the counters 92, 94, and 96 count the number of clock pulses which occur during the time that the output of the AND gates 60, 72 and 74, respectively are "1" (after synchronization with the clock 84. The counter 92 thus counts pulses between the sensing of the leading edge of the gob 10 by the sensors 16 and 18. Since the frequency of the clock 84 is known and the distance the gob 10 must travel between the sensors 16 and 18 is known, the number of counts in the counter 92 may be utilized to determine the average velocity of the gob 10 between the sensing of its leading edge by the sensors 16 and 18. This value is the entrance velocity. Likewise, the number of counts in the counter 94 may be utilized to determine the average velocity of the gob 10 as its trailing edge passes the sensors 16 and 18, which is the exit velocity. The counter 96 counts pulses during the time that the gob 10 is sensed by the sensor 18, i.e. it measures transit time. The output of each of the counters 92, 94 and 96 is connected to the computer 34. In addition, the output of the counter 92 is connected to the swept clock 36.

The output of the counter 92 is proportional to the entrance velocity of the gob 10, and is utilized to determine the initial frequency of the swept clock 36. The digital output of the counter 92 is placed in a memory which is part of the swept clock 36. The output of the memory is a digital representation of the velocity. This is converted to an analog voltage by a digital to analog converter contained in the swept clock 36. The analog voltage is thus proportional to the entrance velocity of the gob 10. This voltage controls a voltage controlled oscillator. The voltage is linearly ramped up from its initial value in order to increase the frequency of the oscillator so as to compensate for the acceleration of the gob 10. The output frequency of the swept clock 36 thus starts at an initial value which is proportional to the entrance volocity of the gob 10 and increases as a function of the acceleration of the gob 10. In this way the control signals from the swept clock 36 cause scans to be taken at equal and known increments in the motion of the gob 10.

Referring now to FIG. 5, a partial timing diagram of the circuit of FIG. 4 is shown. The output of sensor 16 goes from "0" to "1" at time $t_1$. This corresponds to the sensing of the leading edge of the gob 10 by the sensor 16. When the sensor 18 senses the leading edge of the gob 10, at time $t_2$, its output goes from "0" to "1". The outputs of the sensors 16 and 18 go back to "0" at times $t_3$ and $t_4$ respectively, corresponding to the sensing of the trailing edge of the gob 10. The output of the AND gate 68 is "1" between times $t_1$ and $t_4$. The output of the AND gate 60 is "1" between times $t_1$ and $t_2$, the output of the AND gate 72 is "1" between times $t_3$ and $t_4$, and the output of AND gate 74 is "1" between times $t_2$ and $t_4$. The clock pulses, which are not shown to scale (in the present embodiment of the invention a 5 MHz clock is used), are counted during these time periods by the corresponding counters 92, 94, and 96 (after synchronization by the flip flops 78, 80, and 82).

Referring to FIG. 6, the data acquisition control circuit 32 is shown. Line 48, which carries the reset release signal, is connected to the clock input of a flip flop 100 whose Q output was previously preset to "1". When the reset release signal goes from "0" to "1", it clocks the flip flop 100, passing a "0" at the data input to the Q output of the flip flop 100. This output is connected to the input of an inverter 102. The output of the inverter 102 is the reset signal 41. The output of the inverter 102 is also connected to an inverter reset input of a flip flop 108, to the input of an inverter 110, and to an input of an AND gate 112. The output of the inverter 110 is connected to the clear input of an counter 114. The $\overline{Q}$ output of the flip flop 108 is connected to the other input of the AND gate 112, and the output of the AND gate 112 is connected to an inverted reset input of a flip flop 106. Initially, the $\overline{Q}$ output of the flip flop 108 is "1", and the Q output of the flip flop 106 is "0".

When the output of the inverter 102 goes from "0" to "1" (i.e. after the reset release signal clocks the flip flop 100), the counter 114 is cleared through the inverter 110 and the output of the AND gate 112 goes from "0" to "1". Line 49 is connected to the clock input of the flip flop 106, thus causing the flip flop 106 to be clocked by the cycle start signal. When the cycle start signal goes from "0" to "1", a "1" at the data input of the flip flop 106 is passed to its Q output. This output is connected to an input of an AND gate 116 and to an input of an AND gate 118. The output of the swept clock 36 is connected to the other input of the AND gate 116, so that when the Q output of the flip flop 106 goes to "1" the AND gate 116 passes the output of the swept clock 36. The output of the AND gate 116 is connected to the clock input of the counter 114 and is also the scan start output which is connected to the outline measurement circuits 38 and 39. Each pulse of the swept clock 36 which occurs after the cycle start signal goes to "1" thus causes a scan start signal to be generated and causes a count to be added to the counter 114. After the total number of desired scan start signals have been generated, the counter 114 generates a "1" to the clock input of the flip flop 108. As previously stated, 512 scans are made in the present embodiment of the invention and the counter 114 thus generates a "1" after is has made 512 counts.

After each scan is completed scan done signals of logic "1" are generated along lines 42 and 43, which are connected to the inputs of an OR gate 120. The output of the OR gate 102 is connected to an input of the AND gate 118. The output of the AND gate 118 thus goes to "1" with the Q output of the flip flop 106 is "1" (i.e. the cycle start signal has been received) and scan done signal is generated. The output of the AND gate 118 is connected to the memory 44, and a "1" from the AND gate 118 causes the memory 44 to acquire data from the outline measurement circuits 38 and 40. The method in which the memory acquires data from the circuits 38 and 40 is conventional and need not be discussed here. The speed of acquisition of the memory 44 is such that all data is acquired well before the next scan start signal is generated. After the memory 44 has completed its acquisition of data, a "1" is generated to an input of an AND gate 104. The $\overline{Q}$ output of the flip flop 100 is connected to the other input of the AND gate 104, and is "1" during the entire time that the memory 44 is acquiring data. The output of the AND gate 104 thus goes from "0" to "1" after the data from each scan has been acquired by the memory 44. The output of the AND gate 104 is line 51 and is connected to the outline measurement circuits 38 and 40.

The control operation of the circuit of FIG. 6 is such that scan start signals are generated, causing the cameras 20 and 22 to make successive scans. When each scan is completed, the data gained from it is placed in the memory 44. After the memory 44 has completed its acquisition of data, a signal is generated to the outline measurement circuits 38 and 40, readying them to make data measurements for the next scan. The next scan start signal is then generated and the procedure is repeated. When the total number of desired scans has been completed, the counter 114 generates a "1" to clock the flip flop 108. This passes a "1" from the data input to the Q output of the flip flop 108 and causes the $\overline{Q}$ output of the flip flop 108 to go to "0". This causes the output of the AND gate 112 to go from "1" to "0", thus resetting the flip flop 106 so that its Q output is "0". The Q output of the flip flop 108 is connected to the input of an inverter 122. The output of the inverter 122 is connected to an inverted preset input of the flip flop 100. Thus when the flip flop 108 is clocked, the output of the inverter goes from "1" to "0" and presets the flip flop 100. This causes the $\overline{Q}$ output of the flip flop 100 to switch from "1" to "0", which in turn causes the output of the AND gate 104 to be "0". The Q output of the flip flop 100 goes from "0" to "1", causing the output of the inverter to go from "1" to "0", thus resetting the flip flop 108, as well as various other components in the system connected to line 41. This is the initial position, and the cycle repeats itself beginning with the next reset release signal.

Referring now to FIG. 7, the operation of the outline measurement circuits 38 and 40 will be described. The circuits 38 and 40 are identical and thus only the circuit 38 will be described. The line 37 from the control circuit 32 is connected to the clock input of a flip flop 123. When a scan start signal is generated, the flip flop 123 is clocked and a "1" at the data input is passed to the Q output. The Q output of the flip flop 123 is connected to the data input of a flip flop 124. The output of a clock 126 is connected to the clock input of the flip flop 124, the clock inputs of three flip flops 144, 148, and 154, and to the inputs of a pair of inverters 128 and 129. Thus, the first clock signal received by the flip flop 124 after the output of the flip flop 123 goes to "1" will cause a "1" to be passed from the data input to the Q output of the flip flop 124. The Q output of the flip flop 124 is connected to an input of AND gates 130, 132 and 134, the set input of an RS flip flop 136, and the inverted preset input of a flip flop 138. The output of the inverter 128 is connected to the other input of the AND gate 130. Thus, when the Q output of the flip flop 124 goes to "1", the inverted clock signal is passed to the output of the AND gate 130. The output of the AND gate 130 is connected to the count input of a counter 140. The counter 140 thus counts the inverted clock pulses.

The output of the camera 20 is connected to the input of an inverter 142, to the data input of the flip flop 144, and to an inverted reset input of a flip flop 146. The output of the inverter 142 is connected to the R input of the RS flip flop 136 and to the clock input of the flip flop 138. The output of the camera 20 is a time scan of the photodiode array, and the scanning rate is equal to and synchronous with the frequency of the clock 126. The output of each photodiode in the array is "1" if a gob is present and "0" if no gob is present. Therefore, the output of the camera 20 will be "0" when the photodiode being scanned does not sense a gob, and "1" when the photodiode being scanned does sense a gob. The inverted camera signal from the inverter 142 will be "1" until the first edge of the gob is sensed, "0" from the first edge to the second edge of the gob 10, and "1" after the second edge of the gob 10 has been sensed.

At the start of a scan, the Q output of the flip flop 124 is "0", and the output of the inverter 142 is "1". The output of the flip flop 136 is thus "1". When the scan start signal is received the Q output of the flip flop 124 goes to "1", and the output of the flip flop 136 remains at "1". When the output of the inverter 142 goes from "1" to "0" (i.e. when the first edge of the gob 10 is sensed), the output of the flip flop 136 will also go to "0". The output of the flip flop is connected to an input of the AND gate 132. As previously stated, the Q output of the flip flop 124 is connected to the other input of the AND gate 132. The output of the AND gate 132 is thus "1" from the time a scan start signal is received (which causes the Q output of flip flop 124 to go to "1") until the first edge of the gob 10 is sensed (which causes the output of the inverter 142, and thus the flip flop 136, to go to "0"). The output of the AND gate 132 is connected to the data input of a flip flop 148. The flip flop 148 is clocked by the clock 126, thus synchronizing the output of the AND gate 132 with the clock 126. The synchronized output of the flip flop 148 is connected to an input of a NAND gate 150. The output of the inverter 129 (i.e. the inverted clock signal) is connected to the other input of the NAND gate 150. The output of the NAND gate 150 is connected to the clock input of a counter 152. The counter 152 thus counts the inverted clock pulses which occur during the time that the output of the flip flop 148 is "1". When the output of the inverter 142 goes from "0" to "1" (i.e. when the second edge of the gob 10 is sensed) the flip flop 138 is clocked and the Q output, which was initially "1", goes to "0". The Q output of the flip flop 138 is connected to an input of the AND gate 134. Since the Q output of the flip flop 124 is connected to the other input of the AND gate 134, the output of the AND gate 134 will be "1" from the time a scan start signal is received (causing the Q output of the flip flop 124 to go to "1") until the second edge of the gob 10 is sensed (causing the Q output of the flip flop 138 to go to "0"). This corresponds to the time from the beginning to a scan until the second edge of the gob 10 is sensed. The output of the AND gate 134 is connected to the data input of the flip flop 154, which serves the same synchronization function as the flip flop 148. The output of the flip flop 154 is connected to an input of a NAND gate 156, while the output of the inverter 129 is connected to the other input of the NAND gate 156. The output of the NAND gate 156, which serves the same function as the NAND gate 150, is connected to the clock input of a counter 158. The counter 158 thus counts inverted clock pulses which occur during the time that the output of the flip flop 154 is "1".

The output of the NAND gate 156 is also connected to the input of an inverter 160 and the clock input of the flip flop 146. The output of the inverter 160 and the Q output of the flip flop 146 are connected to the inputs of and AND gate 162. The inverter 160 serves a delay function, in order to synchronize its output with the output of the flip flop 146. Initially, the output of the camera 20, which is connected to an inverted reset input of the flip flop 146, is "0", which holds the Q output of the flip flop 146 at "1". This allows pulses from the inverter 160 to pass through the AND gate 162. The output of the AND gate 162 is inverted by an inverter 164, output of which controls the counting of a counter 168. The purpose of the inverter 164 is to synchronize the counting of the counter 168 with the counter 158. The counter 168 thus counts all of the clock pulses which occur from the beginning of a scan until the sensing of the first edge of the gob 10. When the first edge of the gob 10 is sensed, the output of the camera 20 goes to "1". This causes the flip flop 146 to toggle every time a pulse from the NAND gate 156 is received at its clock input. The flip flop 146 thus acts as a frequency divider, and its output is a pulse train of half the frequency of the output frequency of the NAND gate 156. This causes the output of the AND gate 162 to go to "1" only when every other pulse from the inverter 160 is received. When the second edge of the gob 10 is sensed, the output of the camera 20 will go to "0", and no more pulses will be received from the NAND gate 156. The counter 168 will thus make a count corresponding to all of the clock pulses occurring from the beginning of a scan until the first edge of the gob 10 is sensed, and one half of the clock pulses occurring between the sensing of the first and second edges of the gob 10. This count thus corresponds to the center of the gob 10 for that particular scan.

The output of the camera 20 is connected directly to the data input of the flip flop 144, which is clocked by the clock 126. The output of the flip flop 144 is connected to a NAND gate 170. The output of the inverter 129 is connected to the other input of the NAND gate 170. The output of the NAND gate 170 is connected to the clock input of a counter 172. Thus, during the time that the signal from the camera 20 is "1" (after synchronization with the clock 126) inverted clock pulses are passed through the NAND gate 170 and counted by the counter 172. Since the camera output is "1" when a gob is sensed, the counts in the counter 172 correspond to the width of the gob for that particular scan.

The capaicity of the counter 140 is equal to the number of photodiodes in the camera array, which in the present embodiment is 768. Since the frequency of the clock 126 which controls the counter 140 and the rate of scanning of the photodiode array is the same, each count of the counter 140 corresponds to the scanning of one photodiode in the array. Thus, when the counter 140 reaches 768 all of the photodiodes in the array have been scanned. At that point a "1" is generated by the counter 140 to an inverter 174. This causes the output of the inverter 174, which is connected to an inverted reset input of the flip flop 122 to go from "1" to "0", thus causing the Q output of the flip flop 122 to go to "0". This in turn causes the Q output of the flip flop 124 to go to "0", thus presetting the flip flop 138 (so that its Q output is "1") and causing the output of the flip flop 136 to go to "1". In addition the outputs of AND gates 130, 132, and 134 either go to or remain at "0". The $\overline{Q}$ output of the flip flop 124 is connected to the input of an inverter 176 and goes from "0" to "1". When the next scan start signal is received, the $\overline{Q}$ output of the flip flop 124 goes from "1" to "0" and the output of the inverter 176 goes from "0" to "1". This signal serves as a camera start signal for the next scan and a scan done signal for the previous scan. The scan done signal is connected to the data acquisition control circuit 32 and allows the numbers in the counters 152, 158, 168, and 172 to be loaded into the memory 44. When the memory 44 is loaded, the Creset signal is generated on line 51 and the counters 140, 152, 158, 168, and 172 are cleared. The loading of the memory 44 and the clearing of the counters 140, 152, 158, 168 and 172 takes place before the next scan start signal clocks the flip flop 122 and starts the next scanning sequence.

From the foregoing description, the gob measurement sequence may be summarized as follows. As a gob falls, it breaks the path of a laser beam to begin a measurement cycle. During a measurement cycle, 512 horizontal scans are made at equal increments along the vertical axis of the gob. The rate of scanning is controlled by a swept clock. During each of the 512 scans the entire 768 photodiode array contained in each camera is serially scanned. Four counters, whose counting rate is equal to the scanning rate of the photodiode array, count up to values which represent the horizontal extent of the gob and the location of the edges and center of the gob. After each of the 512 scans, the values in the counters are placed in a memory. The counters are then reset and the next scan is made. After all 512 scans have been made and the values from the counters for each scan have been placed in the memory, a computer utilizes the information to determine the volume and shape of the gob being measured. For each scan of the cameras the computer multiplies the horizontal extent measurements together and then multiplies the product by $\pi/4$ in order to determine the cross-sectional area of the gob at the point of each scan. This area is then multiplied by the distance between scans (i.e. the height of each slice of the gob) to obtain the volume of the gob represented by each scan. The volumes of all 512 scans are then summed to obtain the volume of the entire gob.

In addition to being utilized to determine the volume of the gob 10, the data in the memory 44 may be utilized to form an image of the gob 10 on a display screen. This allows more accurate checking of the shape of the gob 10 than does visual observation of the gob during its fall. Each horizontal extent measurement is utilized to drive a single line in the display 46. The display is turned on at a location of the screen corresponding to the first edge of the gob 10 and turned off at a location corresponding to the second edge of the gob 10. A display is generated corresponding to each of the cameras 20 and 22. Thus, the final display contains two images of the gob 10 from views separated by 90°.

The volume and weight information which is determined by the computer 34 is sent to the display 46 in order to provide a visual readout. In addition, the centerline measurements which were stored in the memory 44 are utilized by the computer 34 to determine the relative tilt of the gob 10 as it falls. Selected center points are analyzed in order to determine the angle of a line passing through them with respect to vertical. A visual readout of this information is also generated on the display 46.

What is claimed is:

1. A system for determining the volume of a falling gob of molten glass, comprising:
   glass feeder means for forming and delivering a gob of glass;
   means for measuring, at predetermined increments in the motion of the gob as it falls from said feeder means, the horizontal extent of the gob; and
   means for determining, as a function of said predetermined increments and said horizontal extent measurements, the volume of the gob.

2. The system of claim 1 wherein said measurement means includes clock means for controlling the timing of said horizontal extent measurements.

3. The system of claim 2 wherein the initial frequency of said clock means is a function of the velocity of the gob as it passes a reference point.

4. The system of claim 1 wherein said measurement means includes camera means for viewing the gob as it falls, said camera means including photosensor means for providing a digital output representative of the horizontal extent of the gob at a particular point along its length.

5. The system of claim 1 further including means for measuring the length of the gob as it falls.

6. The system of claim 5 wherein said length measurement means includes:
   means for providing a light beam transverse to the path of the falling gob and means for determining when the beam is interrupted; and
   means for measuring the length of time that the beam is interrupted by the falling gob.

7. The system of claim 6 wherein said light beam is a laser beam.

8. The system of claim 1 wherein said measurements means includes means for making first and second horizontal extent measurements separated by approximately 90° with respect to the gob.

9. The system of claim 1, 4 or 8 further including means for generating, as a function of said horizontal extent measurements, a display of the shape of the gob.

10. The system of claim 1, 4, or 8 further including means for determining, as a function of said horizontal extent measurements, the relative tilt of the gob with respect to its path of travel.

11. A method for determining the volume of a gob of molten glass being delivered from a glass feeder, comprising the steps of:
   severing a gob so as to allow it to fall freely from said glass feeder;
   generating timing signals corresponding to predetermined increments in the motion of the gob;
   successively measuring the horizontal extent of the gob at a plurality of points along its length in response to said timing signals; and
   electronically determining, as a function of said horizontal extent measurements and said predetermined increments, the volume of the gob.

12. The method of claim 11 further including the step of determining the length of the gob as it falls.

13. The method of claim 11 further including the step generating, as a function of said horizontal extent measurements, a display of the shape of the gob.

14. The method of claim 11 wherein said measurement step includes making first and second horizontal extent measurements separated by approximately 90° with respect to the gob.

15. The method of claim 13 or 14 further including the step of electronically determining the relative tilt of the gob with respect to its path of travel.

* * * * *